3,573,070
PROCESSES FOR PREPARING DEHYDRATED
POTATOES
John C. Smith, David A. Butler, Jerry J. Opella, and
Glen D. Porter, Houston, Tex., assignors to Uncle
Ben's, Inc., Houston, Tex.
Filed Nov. 9, 1967, Ser. No. 681,814
Int. Cl. A23b 7/03; A23l 1/12
U.S. Cl. 99—207
5 Claims

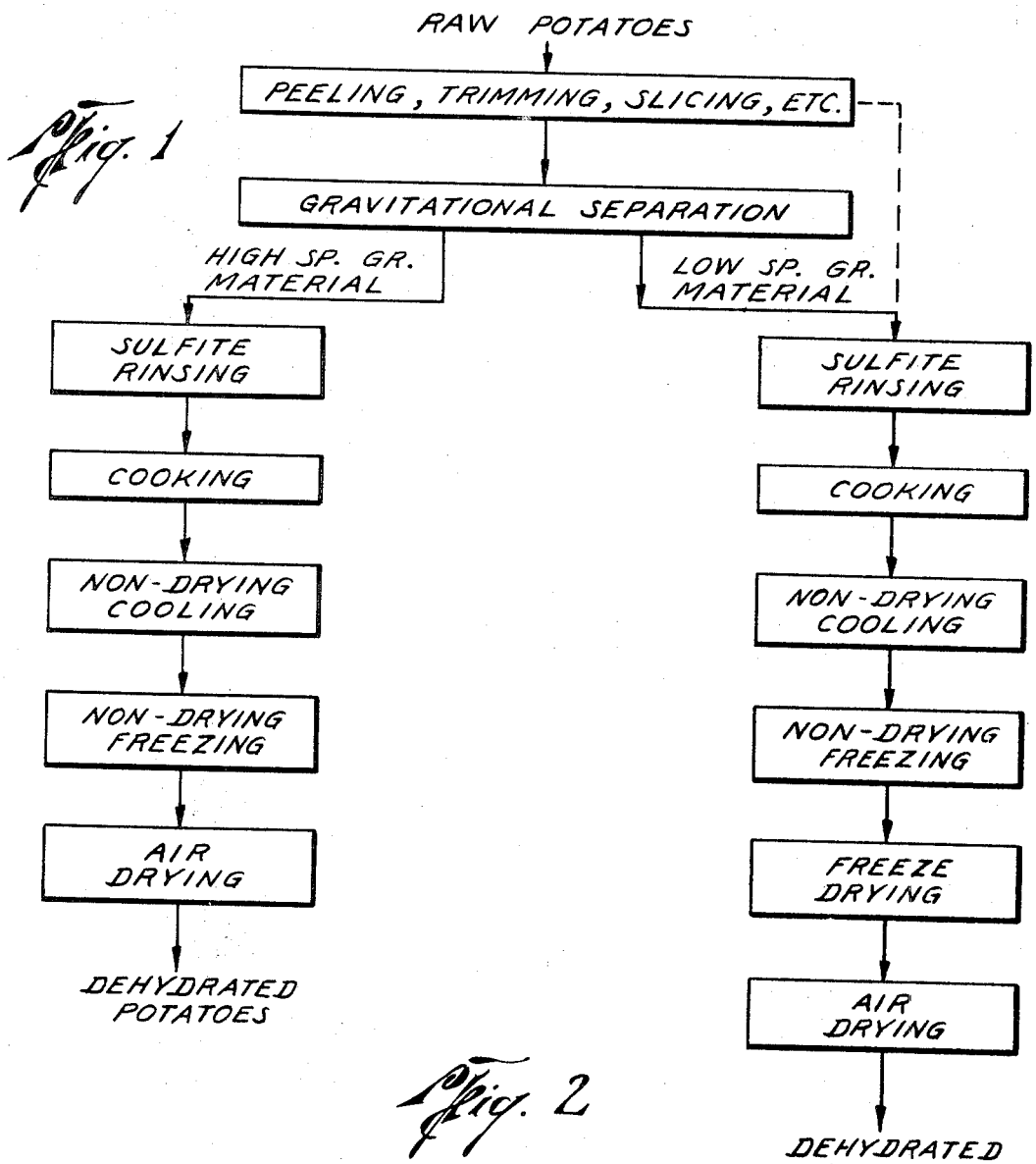
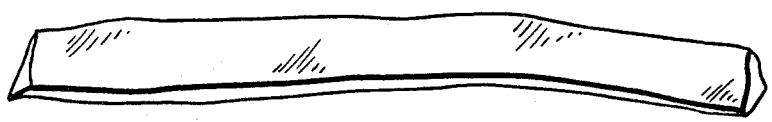

ABSTRACT OF THE DISCLOSURE

The present invention relates to methods for dehydrating white potatoes whereby an entire potato may be processed without formation of hard, vitreous material thus promoting quick rehydration. Generally, the method includes initial preparation of the potato such as peeling, trimming and slicing with appropriate chemical rinsing followed by cooking to gelatinize the slices; cooling, freezing; freeze drying; and air drying. In alternative embodiments, prior to cooking the cut pieces may be subjected to density fractionation with isolation of the heavier pieces for further processing by cooking, cooling, freezing and air drying.

BACKGROUND OF THE INVENTION

Innumerable methods have been proposed in the past for preserving white potatoes by dehydration. Generally speaking, many of the proposed methods have involved some form of cooking, freezing and drying in order to reduce moisture content of raw potatoes so that an ultimate consumer may rehydrate the product by soaking the potatoes in water and heating to yield an edible dish. In most instances, dehydration processess have attempted by one way or another to overcome the formation of hard, vitreous material resulting from collapse of cellular structure within a potato. Such vitreous material greatly hinders and can even preclude rehydration of potato pieces since re-entry of moisture into the cellular structure is prevented. Moreover, the appearance of such material is objectionable and substantially reduces marketability of a potato product having even small amounts of the vitreous matter.

Conventional methods for dehydrating potatoes have usually involved either a time consuming, closely controlled freezing step or an even more onerous drying step such as use of a vacuum chamber operating at very low absolute pressure to remove moisture as ice vapor through sublimation. As is apparent, extended freezing times greatly increase the amount of equipment necessary to process a given amount of potatoes while the use of a vacuum chamber in the drying step necessitates not only expensive and cumbersome vacuum facilities but, in order to accomplish significant amounts of drying, heat must be supplied to evaporate the ice. The transfer of this heat must be accomplished in such a manner that localized overheating and melting of the ice crystals does not occur. Thus vacuum freeze-drying requires close observation, is slow and is limited in capacity since it is usually restricted to batch-type operations.

SUMMARY OF THE PRESENT INVENTION

As indicated by way of background herein, preservation of potatoes by dehydration involves processing under closely controlled conditions so as to remove moisture without degradation of cellular structure of a potato. The present invention uniquely improves conventional processing methods to provide a dehydrated potato product essentially if not totally, free of hard, vitreous matter wherein gelatinized potato pieces may be frozen rapidly and dried at atmospheric pressure by sublimating water to remove a part of the moisture and establish cellular integrity or stability of the potato pieces such that the pieces may then be dried rapidly by air to a lower moisture content. The method of the invention results in a dehydrated product that is readily rehydratable for quick cooking and consumption wherein an edible and appetizing appearing product is formed.

By way of preface to an alternative embodiment of the present invention, it has been found that the core of a white potato is substantially higher in sugar, water and fiber concentration and is more susceptible to cellular collapse than is the material near the periphery of a potato. The discovery of this phenomenon thus gives rise to yet a further improvement over conventional dehydration processes by subjecting cut pieces of raw, white potatoes to gravitational separation or density fractionation to separate the core material which is of lower specific gravity from peripheral material of higher specific gravity. The low specific gravity material is then processed by the first embodiment of the present invention wherein atmospheric pressure freeze drying is employed to partially dehydrate the pieces after being cooked and frozen. Then the higher specific gravity material may be cooked, frozen and dried such as by air drying without necessity of the atmospheric pressure freeze drying step. Again the net result is a dehydrated potato product having essentially no vitreous, hard matter.

It is therefore, an object of the present invention to provide a method for preserving potatoes by dehydration wherein remarkably little hard, vitreous matter results.

Another object of the present invention is the provision of a method for dehydrating potatoes wherein raw potatoes are sliced or otherwise cut into pieces, cooked so as to gelatinize starch therein, cooled and frozen under substantially non-drying conditions, dried partially by atmospheric pressure sublimation of ice crystals within the potato pieces and further and finally dried such as by air drying to a low moisture content to produce a high quality edible potato product.

Yet a further object of the present invention is the provision of a process for dehydrating potatoes wherein relatively low specific gravity material of a potato is removed from higher specific gravity material by gravity separation or density fractionation in order that the higher specific gravity material may be cooked, frozen and dried by air while only the lower specific gravity or core material need be cooked, frozen and dried by atmospheric pressure sublimation and air drying, all of which results in a high quality, non-vitreous potato product.

Still another object of the present invention is the provision of a method for treating white potatoes to produce a quick-rehydratable dehydrated product by cutting raw potatoes into discrete pieces, cooking the pieces under substantially non-drying conditions so as to gelatinize starch within the pieces, cooling and freezing the pieces under substantially non-drying conditions and removing moisture by sublimation from the frozen pieces so as to preserve stability of cellular structure followed by heated-air drying of the pieces to remove additional moisture.

Yet a further object of the present invention is the provision of such a method for preparing a quick-rehydratable dehydrated potato product wherein the sublimation step is carried out under approximately atmospheric pressure by means of an air stream moving through the pieces.

A still further object of the present invention is the provision of a method of preparing dehydrated potatoes by cutting raw potatoes into discrete pieces, introducing the cut pieces into a liquid medium such as brine having a specific gravity about 0.01 less than the average specific gravity of the pieces and separating the lower specific gravity pieces from higher specific gravity pieces for further processing according to the methods herein.

Other and further objects, features and advantages will be apparent in the following description of presently preferred embodiments of the invention, given for the purpose of disclosure and taken in conjunction with the accompanying drawings.

DESCRIPTION OF THE DRAWINGS

In the drawings forming a part of the disclosure herein,

FIG. 1 is a schematic diagram of the processes according to the preferred embodiments of the present invention, FIG. 2 is a representation of typical potato pieces dehydrated according to the present invention demonstrating little or no hard, vitreous material, and FIG. 3 is a representation of typical potatoes dehydrated according to conventional methods wherein formation of hard, vitreous matter is apparent.

DESCRIPTION OF THE PREFERRED EMBODIMENT

For definitional purposes, the potatoes referred to herein are of the white variety which, unless the contrary is clearly indicated, have not been subjected to drying. Typically, white potatoes contain an average of approximately 80% moisture while the remainder is generally starch, sugars and various fibrous substances. The starch is intimately bound up in crystalline form within cells united by fibrous tissues. Water is present both within and between cells and it is well known in the art that removal of such water is difficult without damaging the cellular structure. The usual damage is collapse of the lattice structure of the cells which leads to withering and formation of hard and vitreous portions in potato pieces. Besides their distasteful appearance, such damaged portions also greatly hinder absorption of water when rehydration of the potato pieces is attempted.

In the present invention, dehydration of potatoes is accomplished by cooking raw white potatoes so as to gelatinize starch within the potato pieces followed by cooling and freezing under substantially non-drying conditions so as to freeze all moisture within the pieces. Then, with the pieces in a frozen condition, they are subjected to atmospheric pressure sublimation to remove a portion of the moisture as vapor in order to create structural support within the lattice work of the cellular structure which permits further drying such as by means of heated air. In an alternative embodiment of the invention, the raw potato pieces are subjected to density or gravitational separation whereby relatively low specific gravity material is separated and only it need be subjected to the process which includes atmospheric pressure freeze drying. The higher specific gravity material may be processed without the freeze drying step.

Referring now to FIG. 1 of the drawings and the process of the dotted line of that figure, raw white potatoes are washed and processed conventionally so as to remove stones or any other foreign material. The cleaned potatoes are then peeled by conventional means and trimmed if necessary followed by slicing to cut the potatoes into discrete pieces. In the present invention, the potatoes are preferably sliced into French-fry slices wherein, for example, the slices may be about 3/8 inch by 3/8 inch in cross section.

The slices are then rinsed with a sulfite solution as is conventional to remove sticky surface material as well as to treat the slices to prevent browning. The slices or cut pieces are then cooked to gelatinize the starch. Cooking can be accomplished in saturated air, in water, or by any other means that heats the potato pieces without significantly reducing moisture content during cooking. Cooking temperature may be from the gelatinization temperature of starch at about 150° F. to about 212° F. (such as by pressure cooking) and the time required for cooking may vary from just sufficient to produce gelatinization such as about 15 minutes to 40 minutes or more. The potato pieces must be cooked enough to accomplish gelatinization yet should not be overcooked whereby the pieces become mushy, and tend to disintegrate. The point at which gelatinization is complete may be determined such as by cutting through a piece and observing for opacity over the cross-section of the piece by a microscope as is known in the art.

It is important during cooking that substantially no moisture be evaporated from the cellular structure of the potato pieces in order to maintain fiber and tissues in a supported condition until the drying step is reached as will be explained hereafter. This is true also of all other steps prior to drying.

Once the pieces have been cooked, they are cooled under substantially non-drying conditions preferably by means of a quench bath or otherwise contacting with relatively cool water. The advantages of a conventional quench bath is that the cut pieces may at the same time be contacted with glycine, glucose, alkaline buffers and sulfites to adjust the concentrations of each for proper treatment of the potatoes as is well known in the art.

The cooled potato slices which are still saturated with water are then frozen under substantially non-drying conditions. The freezing step effects retrogradation of the starch which is a type of recrystallization thereof. It has been found that insufficient chilling as well as lack of sufficient moisture within the potato pieces during freezing results in formation of vitreous matter when the pieces are finally dried.

Freezing may be accomplished by any suitable means of heat removal to avoid drying of the product during the freezing process. Thus, cold, saturated air may be contacted with the potato pieces such as by placing the pieces on a porous stainless steel belt and passing the belt through an enclosure wherein cold, saturated air is passed through the bed of material. Other suitable methods include placing the cut pieces in sealed containers and placing in a cold atmosphere or immersing the cut pieces in a suitable cold liquid such as a hydrocarbon or Freon to accomplish non-drying freezing.

In prior conventional methods, the freezing of the potato pieces has been at rates and controlled temperatures adjusted according to drying conditions in order to effect moisture removal. For example certain prior art methods have involved slow freezing rates in a cold environment for a period of many hours to slowly freeze moisture followed by drying in contact with heated air. Other methods have involved very rapid freezing by subjecting cooked pieces to low temperature air wherein the pieces are frozen in an hour or less followed by slow vacuum drying. Still other methods comprise rapid freezing followed by a long holding period at below freezing temperatures in order to accomplish complete freezing of the moisture. Various theories have been advanced as to the propriety and necessity of each freezing method.

In the present invention, however, the freezing rate is not critical so long as there is very little if any loss of moisture during the freezing operation. The present process thus is advantageously adaptable to commercial usage since very rapid freezing may be employed to greatly increase capacity of the freezing operation as will be explained by way of example hereafter. Once moisture within the cut potato pieces has been frozen, the pieces are then maintained in such frozen condition and moisture is removed partially by sublimation under atmospheric pressure conditions so as to preserve stability of cellular structure of the pieces. For example, a porous stainless steel belt may again be used wherein the frozen potato pieces are placed on the belt and are continuously moved through a cold enclosure under atmospheric pressure. As the pieces pass through the enclosure, dehumidified air is passed through the bed of frozen material and ice sublimated and carried away by the air stream. By contrast, conventional methods of removing moisture with vacuum or very low absolute pressure sublimation requires addition of latent heat of sublimation to the system thereby requiring elaborate mechanical heating means. On the other hand, the present invention supplies heat for sublimation through loss of sensible heat by the air stream as well as by friction created by the passage of the air stream through the bed of cut pieces. Thus the present invention is ideally suited to continuous processing while prior freeze drying methods have been limited to batch operation.

The object of the atmospheric pressure freeze drying operation is to remove just enough moisture from the frozen potato pieces to create passageways within the pieces through which further moisture may be removed by more conventional means while at the same time preserving stability of the lattice structure of the cell-fiber network within the pieces. It has been found that if moisture is reduced from the usual initial concentration of about 80% to a total moisture content of not more than approximately 65% to 70%, the necessary stability of the lattice is preserved in order that remaining moisture may be removed by conventional means such as by air drying.

Assuming that a porous stainless steel belt with a dehumidified air stream passing therethrough is used to carry out the sublimation step, then the preferred conditions include maintaining the air stream at temperatures from the freezing point of the potatoes, i.e. about 31–32° F. down to at least as low as 27° F. It will be recognized that temperature of the air may be slightly above 32° F. without thawing the frozen potato pieces since the sublimation step itself removes heat from the pieces. Relative humidity of the air may range from 0 to above 90% while rate of flow of the air may be from 300 to 1,000 feet per minute linear velocity as the air flows preferably generally perpendicularly upwardly or downwardly through the bel. These conditions are not critical and it will be appreciated that they may be adjusted so as to coact and provide optimum sublimating conditions. Although the sublimation step is referred to as being carried out under atmospheric pressure, it will be appreciated that pressures above atmospheric are not objectionable and slight gauge pressures may, in fact, occur since the air may be moving through the bed at very high velocities and thus create a pressure within the system.

Following the sublimation operation, the potato pieces may be thawed or the temperature otherwise allowed to increase above the freezing point in order that additional moisture may be removed such as by conventional air drying means. It is well known that in order for dehydrated potatoes to remain stable during storage, the moisture content therein must be at least as low as 15% and preferably about 10 to 12%. Once stability of the structure of the pieces has been established by the sublimation operation, thawing and drying may be carried out to reduce the moisture content to such level without the formation of vitreous matter.

The preferred method of thawing and drying according to the present invention includes contacting the potato pieces with heated air to evaporate the moisture therein as is well known in the art. However, the temperature of the potato pieces preferably should be maintained below about 130° F. until the moisture has been reduced to a concentration at least as low as about 18 to 20%. If the temperature of the pieces rises above 130° F. at higher moisture levels, the pieces are damaged by heat and undesirable side effects may occur such as absorption of available moisture by the starch which may cause vitrification and poor rehydration characteristics of the final product.

Summarizing the preferred processing steps and conditions of the present invention, white potatoes are washed, etc., cut into pieces, rinsed and treated to prevent browning. The pieces are then cooked to gelatinize the starch by heating under substantially non-drying conditions at a temperature of about 165° F. for approximately 25 minutes. The pieces are then cooled by a quench bath and placed on a porous stainless steel belt to be frozen under substantially non-drying conditions. Cold, saturated air at a temperature preferably at least as low as 21° F. is then passed through the bed of potato pieces for about 30 minutes so that moisture within the pieces is frozen. Relative humidity of the air is then reduced to preferably 50% or lower and temperature raised to about 31° F. so that the moisture is removed by sublimation and the moisture concentration reduced to not greater than approximately 65 to 70%. Then the moisture concentration is reduced to about 10 to 12% by heating the moving air to the range of 115°–130° F. The air preferably is always at about atmospheric pressure as it moves through the bed of potato pieces during each of the steps and it is usually desirable that the process be continuous such as by use of an "endless" belt passing through differing air zones to carry out each of the above steps.

The following examples will now illustrate the advantages and utility of the present invention:

EXAMPLE I

About 46.5 pounds of Russet Burbank potatoes from Washington State were washed, peeled, trimmed and cut into ⅜ inch by ⅜ inch cross sectional French-fry types slices. The slices were then dipped for 30 seconds into a 0.2% sodium bisulfite solution and placed into a cooker. Cooking by contact with saturated air at a temperature of about 165° F. proceeded for 30 minutes whereupon the slices were removed and rinsed with tap water at 75° F. followed by rinsing in cold water at 35° F. to cool the slices. The slices were then treated for browning by immersion in a solution containing 0.75% glucose, 0.75% disodium phosphate and 0.25% glycine. Then the slices were transferred for freezing to a freezing chamber where they were placed on a porous screen support with a 3½ inch bed depth. Saturated air at a temperature of 21° F. and a velocity of about 400 to 450 feet per minute was passed generally perpendicularly and downwardly through the bed for 40 minutes. Then to accomplish sublimation, temperature of the air was raised to 31° F., the relative humidity adjusted to 50% and the velocity increased to about 500 feet per minute. After 13 hours at the adjusted flow rate, the weight of the potato slices was reduced to 50% that of the initial weight which is attributable to loss of moisture. The slices were then dried by passing an air stream through the bed of potatoes for six hours, the air being at a temperature of 115° F. and a velocity of about 400 feet per minute. Total moisture within the potato slices was thus reduced to about 10 to 12%. An outstanding dehydrated product resulted which had no observable vitreous matter as illustrated in FIG. 2. The dehydrated potatoes when rehydrated in tap water had a rehydration ratio of about 4.4 which is the final weight of the pieces divided by the weight of the dehydrated pieces. When the rehydrated pieces were fried in vegetable oil, the slices had 19.1% fat and the fried pieces were quite edible and with good texture. By way of contrast, another sample of the same lot of potatoes was processed as in Example I but partial drying by sublimation was omitted. The resulting product had extensive vitreous matter as illustrated in FIG. 3.

EXAMPLE II

The rate of freezing the potatoes is not critical and may be fast as illustrated by a sample lot of 20 pounds of Russet Burbank potatoes processed as in Example I. However, after cooking, the slices were placed in a two inch bed depth in the freezing chamber and contacted with saturated air at a temperature of −2° F. for 30 minutes. Temperature at the center of the slices was found to be below 26° F. after only five minutes. Then sublimation was effected as in Example I and 50% weight loss was accomplished in 9½ hours. Drying as in Example I for six hours resulted in pieces having no observable vitreous matter. Upon rehydration, the rehydration ratio of the pieces was 4.2 with 20.8% fat and good edibility when fried.

EXAMPLE III

Too little cooking of the potatoes results in poor frying characteristics even though dehydration is accomplished satisfactorily. For example, a lot of Idaho Russet potatoes was treated as in Example I but cooked for only ten minutes. Then the pieces were quenched with 32° F. water for ten minutes followed by contact briefly with the glucose, phosphate and glycine solution as in Example I. The pieces were then frozen at a slow rate as in Example II and subjected to freeze drying sublimation under conditions as in the freeze drying step in Example I. There was a 50% weight loss in the pieces after 14 hours and total moisture content was then reduced to about 14% by heated air drying as in Example I. This resulted in a product having about 0.6% observable vitreous material which was not observed in the prior examples, the vitreous or horny matter being present only in the tips of the slices. The slices had a somewhat low rehydration ratio of 3.88 and contained only 10.9% fat after frying, which indicates the effect of undercooking.

EXAMPLE IV

Overcooking potatoes results in an undesirable mushy type product as illustrated in the processing of a lot of Idaho Russet Burbank potatoes initially trimmed and sliced, etc. as in Example I. However, the slices were cooked in saturated air at a temperature of 155° F. for 30 minutes. Then the slices were rinsed in 75° F. tap water for 5 minutes and soaked for 55 minutes. Again, the slices were cooked for 25 minutes in saturated air at a temperature of 195° F. After cooking, the slices were frozen in a four inch bed depth slowly as in Example I followed by freeze drying sublimation for about 18 hours under the sublimation conditions as in Example I. The slices were next dried by contact with 115° F. air until the moisture was reduced to about 10 to 12%. Practically no vitreous material was observed and the potatoes had a rehydration ratio of 5.11. However, upon frying, the slices contained undesirably high 33.1% fat. Although the potatoes were quite edible, they were mushy in internal texture which is characteristic of overcooking.

EXAMPLE V

Insufficient removal of moisture by sublimation after freezing directly affects the amount of vitreous matter that is formed upon complete drying. For example, Idaho Russet Burbank potatoes were washed, peeled and cut into slices as usual. The slices were cooked for 35 minutes in saturated air having a temperature of 165° F. and rinsed for ten minutes in 75° F. tap water followed by rinsing for ten additional minutes in 32° F. water. Then the slices were immersed in a browning solution as in Example I. The slices were then frozen by contact with saturated air having a temperature of about 21° F. for 40 minutes. Sublimation was begun by contacting the slices with 31° temperature air having 50% relative humidity and total weight loss attributable to loss of moisture by sublimation was 30%, i.e. moisture was reduced from about 80% initially to a total of about 71.5%. Then air drying was carried out by contacting the slices with air at a temperature of about 115° F. until moisture content was reduced to a total of about 10 to 12%. The resulting product had undesirably high 4.7% vitreous matter by weight with a rehydration ratio of 4.1. Upon frying, the slices had 16.3% fat and were edible but not of uniform quality because of the hard matter.

EXAMPLE VI

To illustrate that other varieties of white potatoes may be dehydrated by the present invention, a lot of Norgold Russet potatoes was processed as in Example I except that the pieces were cooked 15 minutes and frozen with saturated air at 21° F. for 40 minutes. The final dehydrated product had no observable vitreous matter and had a rehydration ratio of 4.09. When fried in vegetable oil, the pieces had 16.8% fat with good texture and flavor.

EXAMPLE VII

Still another variety of white potatoes was dehydrated with similar results. A lot of Kennebec potatoes was processed as in Example VI wherein the final dehydrated product had no observable vitreous matter and had a rehydration ratio of 3.56. When fried in vegetable oil, the pieces had 16.7% fat and good texture and flavor.

The center portion or core of a white potato is lower in solids content than the outer portion and higher in sugars, water and fibrous material. It has been found that the core material as well as the veins of similar material which permeate outwardly of the potato have a much greater tendency to form hard, vitreous matter when a potato is dehydrated than does the outer or peripheral portion. Thus, without the necessity of the sublimation drying steps, a high quality dehydrated potato product can be obtained which has little or no vitreous matter if the outer or peripheral material of a potato is processed. Because the undesirable core and related material is lower in specific gravity than the peripheral part of a potato, the low specific gravity matter may be separated and the higher specific gravity material dehydrated to obtain a product practically free of vitreous matter.

Accordingly, a further embodiment of the present invention is directed to separation of relatively low specific gravity potato material from relatively higher specific gravity material wherein the latter may be processed without the necessity of sublimation as previously described in the first embodiment of the present invention. This is attributable to the fact that the higher specific gravity material has a more stable cellular lattice structure which is less susceptible to collapse or damage during dehydration. Generally speaking, it has been found in the present invention that if about 20% of the center or core material in a potato is removed, the hard, vitreous matter is reduced substantially to a level resulting in a product which is comparable to that formed by the first embodiment wherein sublimation was employed for removal of a portion of the moisture from the potato pieces.

EXAMPLE VIII

To illustrate the effect of the core material on the formation of vitreous matter, about 500 pounds of Russet Burbank potatoes from Washington State were separated by salt brines into five groups having specific gravity values of less than 1.080, 1.080–1.085, 1.085–1.090, 1.090–1.095, and over 1.095 respectively. The weight percentage of whole potatoes in each group was 19.5% below 1.080; 19.0% in the 1.080–1.085 range; 28.7% in the 1.085–1.090 range; 19.9% in the 1.090–1.095 range; and 12.9% above 1.095 specific gravity. Twenty-six lots of 6.5 pounds each of potatoes were withdrawn at random from the five groups of potatoes and each lot was processed separately by peeling, slicing into ⅜ inch Frenchfry cuts and immersed briefly in a 0.2% sodium bisulfite solution. Chips and slivers were removed by hand and twenty-one lots were placed in a sodium chloride brine solution having a specific gravity as indicated in Table I. The pieces which floated were drawn off, weighed and discarded while the pieces which sank were rinsed with tap water to remove the brine and then weighed.

The "sinkers," being the heavier specific gravity pieces were cooked by first blanching in 170° F. tap water for 20 minutes, quenched in 65° F. water for 15 minutes, and then cooked in the blanch water for 20 minutes at the temperatures listed in Table I. Following cooking, the pieces in each lot were quenched in 65° F. water for 15 minutes. Then each lot was frozen by placing in a compartment and subjecting the pieces to a saturated air blast wherein the air was at a temperature of about 25° F. and the total contact time was 30 minutes. Then the temperature of the air was raised to about 31° F. and the pieces in each lot were contacted for another 3½ hours to assure complete freezing thereof. Upon freezing, each lot was then dried by contact with air at a temperature of about 130° F. until moisture had been reduced to below 15%. Table I is a tabulation of the results of the processing of the different lots of each specific gravity group.

Washington State group were made up into composite lots as indicated in Table II such that each lot had a specific gravity as indicated. Half of the lots were processed without separation of any material according to specific gravity and the remaining half were subjected to the gravitational separation as described with reference to Table I. Each of the composite lots was washed, peeled, trimmed and sliced as with respect to the process according to Table I and cooked at the temperature listed in Table II. Then the potatoes in each lot were frozen and dried as

TABLE I

| Lot No. | Cooking temp., ° F. | Specific gravity of— | | Percent by weight of— | | Rehydration ratio |
|---|---|---|---|---|---|---|
| | | Whole potatoes of each lot | Brine solution | Slices removed by flotation | Vitreous matter | |
| 1c | 202 | 1.080 | (¹) | 0 | 12.9 | 3.61 |
| 2 | 202 | 1.080 | 1.068 | 15.4 | 7.7 | 3.31 |
| 3 | 201 | 1.080 | 1.072 | 18.4 | 1.1 | 3.82 |
| 4 | 201 | 1.080 | 1.074 | 48.1 | 0.8 | 3.92 |
| 5 | 201 | 1.080–1.085 | (¹) | 0 | 6.3 | 4.16 |
| 6 | 201 | 1.080–1.085 | 1.070 | 6.8 | 4.2 | 4.09 |
| 7 | 201 | 1.080–1.085 | 1.072 | 19.0 | 2.4 | 3.95 |
| 8 | 201 | 1.080–1.085 | 1.074 | 25.0 | 0.3 | 3.84 |
| 9 | 200 | 1.080–1.085 | 1.076 | 29.4 | 0 | 4.33 |
| 10 | 200 | 1.080–1.085 | 1.078 | 21.6 | 1.8 | 3.96 |
| 11 | 200 | 1.085–1.090 | (¹) | 0 | 3.8 | 4.16 |
| 12 | 200 | 1.085–1.090 | 1.074 | 11.3 | 0.6 | 3.94 |
| 13 | 200 | 1.085–1.090 | 1.076 | 18.1 | 1.7 | 3.50 |
| 14 | 200 | 1.085–1.090 | 1.078 | 20.6 | 0 | 3.93 |
| 15 | 199 | 1.085–1.090 | 1.080 | 25.2 | 0 | 3.97 |
| 16 | 199 | 1.085–1.090 | 1.082 | 28.7 | 0.4 | 4.05 |
| 17 | 199 | 1.090–1.095 | (¹) | 0 | 5.0 | 4.14 |
| 18c | 199 | 1.090–1.095 | 1.078 | 10.2 | 0.7 | 3.66 |
| 19 | 199 | 1.090–1.095 | 1.080 | 18.8 | 0.6 | 3.64 |
| 20 | 199 | 1.090–1.095 | 1.082 | 19.3 | 0.6 | 4.03 |
| 21 | 198 | 1.090–1.095 | 1.984 | 21.4 | 1.3 | 3.45 |
| 22 | 198 | 1.090–1.095 | 1.086 | 27.0 | 0 | 2.99 |
| 23 | 198 | 1.095 | (¹) | 0 | 2.2 | 3.61 |
| 24 | 198 | 1.095 | 1.082 | 9.5 | 0.3 | 3.40 |
| 25 | 198 | 1.095 | 1.084 | 9.2 | 0.7 | 3.71 |
| 26 | 198 | 1.095 | 1.086 | 20.2 | 1.0 | 4.12 |

¹ No separation.

As indicated in Table I, one lot of potatoes in each specific gravity group was not subjected to the brine gravitational separation operation and in each such instance the amount of vitreous matter formed was relatively great. In the remaining lots of each specific gravity group, the floating slices were removed from the brine and discarded and the "sinkers" were processed as indicated earlier and the amount of vitreous matter that formed was observed and is tabulated. In each specific gravity group, as the specific gravity of the brine was increased more slices floated and were removed resulting in less number of "sinkers" which caused a corresponding decrease in the amount of vitreous matter formed. Thus the data indicates the great advantage of removing the lower specific gravity material to reduce the ultimate amount of vitreous matter formed when the slices are dehydrated. Generally speaking, it will be observed that the preferred amount of removal of lower specific gravity pieces is about 20% by weight of the total pieces which is accomplished by maintaining specific gravity of the brine approximately 0.01 less than the average specific gravity of the original lot being processed thereby yielding good quality dehydrated potatoes with minimal formation of vitreous matter.

EXAMPLE IX

To further illustrate the second embodiment of the present invention, potatoes from the same Russet Burbank with the previous lots. The results are indicated in Table II.

Lot numbers 27–29 were not subjected to specific gravity flotation and all material of each such lot was processed resulting in high vitreous matter as indicated. By contrast, lot numbers 30–32 were subjected to brines of increasing specific gravity to remove successively more slices resulting in marked decrease of vitreous matter as shown in the table. Thus the effectiveness of removal of low specific gravity material is shown.

TABLE II

| Lot No. | Cooking temp., ° F. | Specific gravity of— | | Percent by weight of— | | Rehydration ratio |
|---|---|---|---|---|---|---|
| | | Whole potatoes of each lot | Brine solution | Slices removed by flotation | Vitreous matter | |
| 27 | 200 | 1.0866 | (¹) | 0 | 11.5 | |
| 28 | 195 | 1.0866 | (¹) | 0 | 7.4 | |
| 29 | 198 | 1.0874 | (¹) | 0 | 6.6 | 3.75 |
| 30 | 198 | 1.0874 | 1.076 | 13.6 | 7.4 | 3.64 |
| 31 | 199 | 1.0874 | 1.078 | 15.3 | 0.5 | 3.69 |
| 32 | 199 | 1.0874 | 1.080 | 20.3 | 0 | 3.99 |

¹ No separation.

Sodium chloride brine was employed as the liquid medium used to accomplish the gravitational separation of the second embodiment of the present invention as discussed in relation to Tables I and II because of its convenience and low cost. However, any other suitable solute can be used which will provide a solution of the desired specific gravity as will be recognized by those skilled in the art.

By way of a third embodiment of the present invention, the first two embodiments may be combined advantageously so as to make effective use of practically an entire potato. Since the core or relatively low specific gravity material of a potato is undesirable in that it has a high tendency to form vitreous material, such lower specific gravity material may be treated by the method of the first embodiment wherein sublimation after freezing is carried out to remove a part of the moisture therein and establish structural stability of the cellular lattice work before being dried by heated air. The remainder of the potato which is of higher specific gravity may then be processed without necessity of the sublimation drying step. Thus, for example, as shown by the solid lines of FIG. 1, raw potatoes may be peeled, trimmed, sliced, etc. Then the slices may be subjected to gravitational separation by placing the pieces in, for instance, a brine bath having a specific gravity of approximately 0.01 less than the average specific gravity of the raw potato lot. Preferably about 20% of the lowest specific gravity material is removed from the brine bath and rinsed in sulfite solution as previously described followed by cooking so as to gelatinize the starch in the process. The slices are then cooled and frozen under substantially non-drying conditions whereupon the frozen pieces are dried partially by sublimation of the moisture as explained in relation to the first embodiment of the present invention and further dried by hot air.

The "sinkers" remaining in the brine bath consist of higher specific gravity material which may be drawn off and likewise rinsed in sulfite solution, cooked so as to gelatinize the starch, cooled and frozen under substantially nondrying conditions and then dried such as by contact with heated air to reduce moisture content thereof to about 10 to 12% resulting in a high quality, dehydrated potato product with practically no vitreous matter and with good texture and flavor. The combined embodiment permits use of the entire potato wherein only about a fifth of the bulk of the potato need be dried partially by sublimation of moisture as ice vapor to establish structural stability of the potato pieces. It becomes apparent that such method greatly improves the economy of the invention without detracting from quality of the final dehydrated product.

The present invention, therefore, is well adapted to carry out the objects and attains the ends and advantages mentioned as well as those inherent therein. While presently preferred embodiments of the invention are given for the purpose of disclosure, numerous changes in the details of operation can be made which will readily suggest themselves to those skilled in the art and which are encompassed within the spirit of the invention and the scope of the appended claims.

What is claimed is:

1. The method of preparing white potatoes to produce a quick-rehydratable dehydrated product comprising,
   (a) cutting the potatoes into discrete pieces,
   (b) subjecting the pieces to density fractionation, separating no more than about 80% by weight of the higher specific gravity pieces into a first portion and separating at least about 20% by weight of the lower specific gravity pieces into a second portion,
   (c) processing the first portion by (i) cooking such pieces under substantially non-drying conditions so as to gelatinize starch therewithin, (ii) cooling and freezing the pieces under substantially non-drying conditions, and (iii) drying the pieces,
   (d) processing the second portion by (i) cooking said pieces under substantially non-drying conditions so as to gelatinize the starch therewithin, (ii) cooling the pieces under substantially non-drying conditions, (iii) freezing the pieces under substantially non-drying conditions, (iv) maintaining the pieces in a frozen condition and removing sufficient moisture as vapor by sublimation so as to preserve stabilityy of cellular structure of the pieces, and (v) drying said pieces so as to remove additional moisture therefrom.

2. The method of claim 1 wherein the density fractionation step (b) is carried out by introducing the cut pieces into a liquid medium having a specific gravity about 0.01 less than the average specific gravity of the pieces in order that at least about 20% by weight of the pieces will float for separation as the second portion and the remainder will sink for separation as the first portion.

3. The method of claim 2 wherein the liquid medium for density fractionation is brine.

4. The method of claim 1 where in the removal of moisture as vapor by sublimation in step (d) (iv), moisture is reduced from its initial concentration to no more than a total of approximately 65 to 70% by weight by means of an air stream moving through the pieces.

5. The method of claim 4 wherein the air stream moving through the potato pieces during sublimation is at about atmospheric pressure and a temperature such that the temperature of the pieces does not exceed about 32° F., a relative humidity of about 0 to about 90% and a flow rate of about 300 to about 1,000 feet per minute.

References Cited
UNITED STATES PATENTS

| | | | |
|---|---|---|---|
| 2,681,285 | 6/1954 | Hendel et al. | 209—173 |
| 2,797,166 | 6/1957 | Siciliano et al. | 99—100P |
| 3,009,816 | 11/1961 | Hendes | 99—207 |
| 3,136,643 | 6/1964 | Reeves et al. | 99—207 |
| 3,438,792 | 4/1969 | Kruger | 99—199 |
| 2,707,684 | 5/1955 | McCready | 99—207 |
| 2,813,796 | 11/1957 | Keneaster | 99—207 |

JOSEPH M. GOLIAN, Primary Examiner

M. G. MULLEN, Assistant Examiner

U.S. Cl. X.R.

99—100